(12) United States Patent
Kasper et al.

(10) Patent No.: US 9,602,487 B2
(45) Date of Patent: Mar. 21, 2017

(54) METHOD FOR THE PROTECTED TRANSMISSION OF DATA

(71) Applicant: Robert Bosch GmbH, Stuttgart (DE)

(72) Inventors: Bjoern Kasper, Ingersheim (DE); Andreas Soenkens, Remseck am Neckar (DE); Thorsten Schwepp, Korb (DE)

(73) Assignee: ROBERT BOSCH GMBH, Stuttgart (DE)

( * ) Notice: Subject to any disclaimer, the term of this patent is extended or adjusted under 35 U.S.C. 154(b) by 86 days.

(21) Appl. No.: 14/482,278

(22) Filed: Sep. 10, 2014

(65) Prior Publication Data
US 2015/0074404 A1 Mar. 12, 2015

(30) Foreign Application Priority Data

Sep. 11, 2013 (DE) .................. 10 2013 218 212

(51) Int. Cl.
*H04L 9/32* (2006.01)
*H04L 29/06* (2006.01)
*H04W 12/04* (2009.01)
*H04W 12/06* (2009.01)
*H04W 56/00* (2009.01)

(52) U.S. Cl.
CPC ............ *H04L 63/08* (2013.01); *H04L 63/061* (2013.01); *H04L 63/123* (2013.01); *H04L 63/126* (2013.01); *H04W 12/04* (2013.01); *H04W 12/06* (2013.01); *H04W 56/001* (2013.01); *H04W 56/0015* (2013.01)

(58) Field of Classification Search
None
See application file for complete search history.

(56) References Cited

U.S. PATENT DOCUMENTS

| 5,506,905 A * | 4/1996 | Markowski | G07C 9/00182 380/262 |
| 5,767,784 A * | 6/1998 | Khamharn | G07C 9/00182 340/5.23 |
| 7,346,138 B2 * | 3/2008 | Fazel | H04L 7/042 375/354 |

(Continued)

FOREIGN PATENT DOCUMENTS

DE  102009002396  10/2010

*Primary Examiner* — Farid Homayounmehr
*Assistant Examiner* — Olanrewaju Bucknor
(74) *Attorney, Agent, or Firm* — Gerard Messina

(57) ABSTRACT

A method for authenticating a transmitter to a receiver, as well as for the protected transmission of messages; both the transmitter, as well as the receiver at least having a first common key; a random number, as well as at least one first partial code of a first code calculated from the random number with the aid of the first key from the receiver to the transmitter being transmitted in a synchronization message; the first partial code being checked by the transmitter; a first counter being generated by the transmitter; useful data, as well as a first partial counter of first counter and at least one second partial code of a second code calculated with the aid of a second key being transmitted by the transmitter to the receiver in a message; and the receiver checking the second partial code to verify the transmitter, as well as the transmitted message.

18 Claims, 3 Drawing Sheets

(56) References Cited

U.S. PATENT DOCUMENTS

| | | | | |
|---|---|---|---|---|
| 8,527,755 B2* | 9/2013 | Unger | ............... | H04L 9/0891 |
| | | | | 380/229 |
| 8,983,069 B2* | 3/2015 | Merchan | ............ | H04L 9/0869 |
| | | | | 380/37 |
| 2004/0123102 A1* | 6/2004 | Gehrmann | ........... | H04L 9/3242 |
| | | | | 713/161 |
| 2005/0198528 A1* | 9/2005 | Unger | ............... | H04L 9/0891 |
| | | | | 726/22 |
| 2010/0268949 A1* | 10/2010 | Schuetze | ............ | H04L 9/002 |
| | | | | 713/168 |
| 2013/0010954 A1* | 1/2013 | Falk | .................. | H04L 9/3236 |
| | | | | 380/255 |
| 2013/0170507 A1* | 7/2013 | Hsueh | ............... | H04L 63/0428 |
| | | | | 370/503 |

* cited by examiner

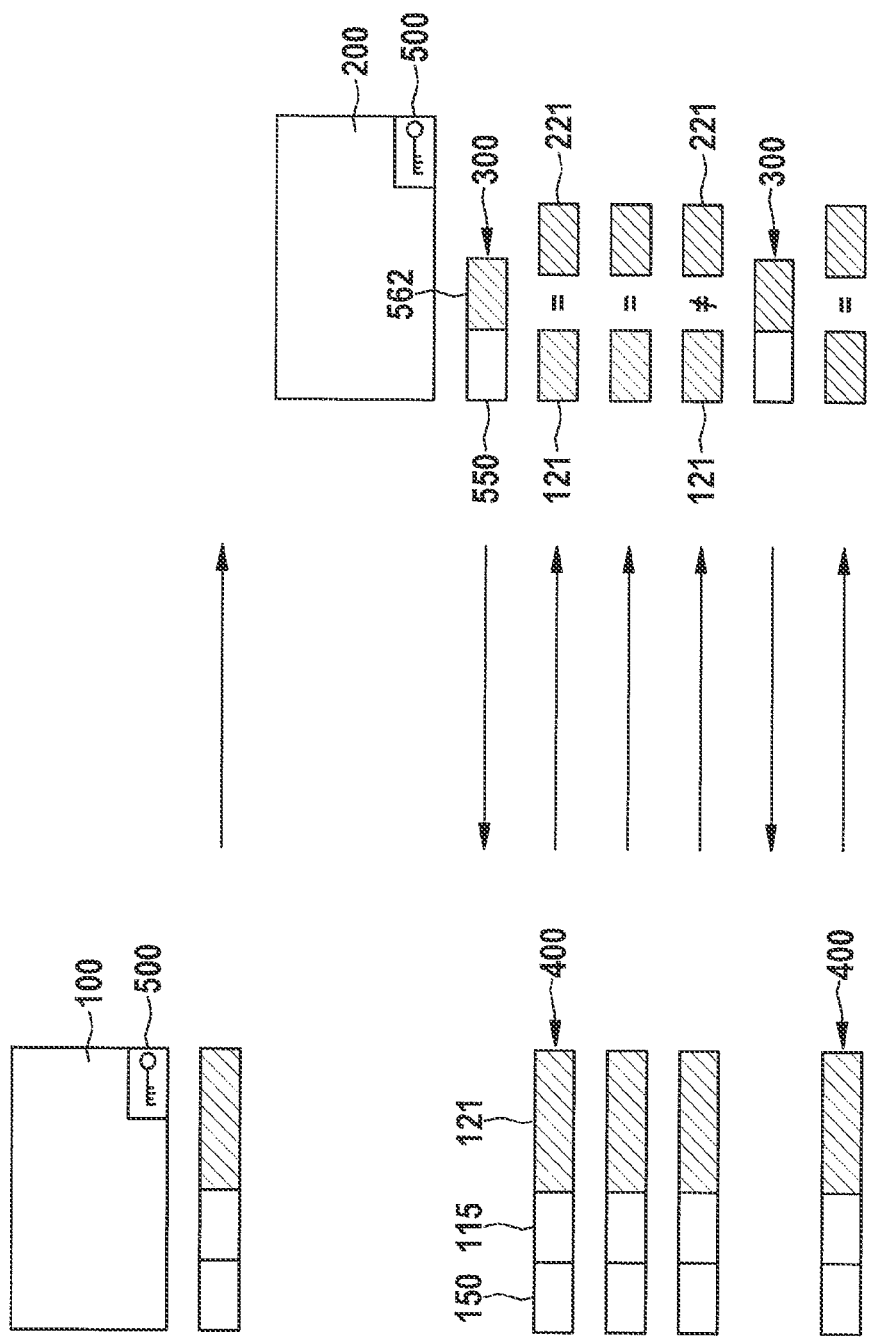

METHOD FOR THE PROTECTED TRANSMISSION OF DATA

FIELD OF THE INVENTION

The present invention relates to a method for authentication of a transmitter to a receiver, and to the protected transmission of messages.

BACKGROUND INFORMATION

In communications networks, as are used in modern vehicles, for example, various communication partners, such as control units, communicate with one another. In the process, messages are sent by a transmitter and received by at least one receiver.

To provide a secure communication, it is expedient that the messages transmitted via the communication network be protected, i.e., reliably protected against manipulation. For this purpose, it is useful that both a transmitter be authenticated to a receiver, and that the integrity of the transmitted data be ensured over the course of time.

German Published Patent Application No. 10 2009 002 396 describes a method for protecting against manipulation in the transmission of data in a communication network, in particular in vehicles. In this case, a transmitter is authenticated to a receiver via a challenge-response authentication, i.e., the transmitter authenticates itself to the receiver by solving a task set by the receiver and, in the process, uses means only known to the transmitter and the receiver. The receiver generates a random number of a 64-bit length and transmits this, together with its identification number of a 32-bit length, to the transmitter. The transmitter receives this message and uses a key known to the transmitter and the receiver to calculate a code therefrom. The transmitter subsequently transmits at least a portion of the 64-bit length of this code, together with its identification number, to the receiver. The receiver can calculate the same code and compare it to the code received by the transmitter. If the two match, and the receiver also recognizes that the identification number of the transmitter is correct, the transmitter has thus authenticated itself to the receiver.

Following the authentication to the receiver, the transmitter can transmit protected messages containing useful data to the receiver. For that purpose, in addition to the useful data, the messages also include a further code that is calculated from the data and a counter. To ensure the integrity of the messages, the counter changes in the process following each transmitted message.

An authentication in accordance with the above method requires at least one message from the receiver to the transmitter and at least one message from the transmitter to the receiver. Thus, for communication networks where the maximum length of the message is less than 96 bits, such as the Controller Area Network (CAN), for example, altogether at least four messages are needed for one authentication.

In the case of a time-critical transmission of data, such as safety-critical control interventions in a vehicle, for example, a shortest possible time duration (latency time) is desired between the first transmission of a message, i.e., the start of the authentication, and the first possible utilization of a message, i.e., the first transmission of useful data.

The above method does not make it possible to ensure an appropriately short time duration for all states of the communication network, such as for initializing the communication network.

Therefore, there is a need for a method that will make it possible to reduce the latency time in the context of the protected transmission of data.

SUMMARY

The present invention provides a method for authenticating a transmitter to a receiver, as well as for the protected transmission of messages, having the features set forth in Claim 1. Advantageous embodiments constitute the subject matter of the dependent claims, as well as of the following description.

A method according to the present invention ensures a short time duration (latency time) in a communication network until data are sent by a transmitter for the first time as protected data to a receiver, the transmitter authenticating itself to the receiver. Useful data are data that are sent in messages, not for authentication, rather for purposes of operating the transmitter and receiver. For example, these are data needed in the course of an operation, for diagnostic purposes, or for programming a vehicle. Accordingly, these data are used for purposes other than for the authentication.

In this case, the receiver first transmits a synchronization message to the transmitter; both a random number generated by the receiver, as well as a first partial code of a first code calculated from the random number using a first key, preferably in the manner of a checksum, respectively a hash value, being contained therein. The transmitter is able to check the received first partial code, in particular through a comparison with a third partial code of a third code calculated using the received random number and the third code calculated using its own first key. Both the receiver, as well as the transmitter may then use at least one portion (in particular, other than the one transmitted) of the first, respectively third code, in each case as a counter. Subsequently thereto, the transmitter may transmit already useful data to the receiver in a message. In this context, this message also contains a portion of the (in the following first) counter of the transmitter, which is referred to in the following as the first partial counter, as well as a portion of a second code calculated using a second key that is referred to in the following as the second partial code. The receiver is able to check this second partial code and thereby authenticate the receiver, as well as ensure the integrity of the received message. Thus, only one initial synchronization message is necessary until data are able to be sent from the transmitter to the receiver as protected data.

Using the second key, the transmitter advantageously calculates the second code from the useful data, the first partial counter, as well as the entire first counter. The second code is calculated in this manner both from the data transmitted in the message, as well as from the data not transmitted in the message (namely, the entire first counter). This provides protection against manipulation, since not everything needed for calculating the second code is visible on the communication medium.

The portion of the first code that is transmitted in the synchronization message, thus the first partial code, preferably does not correspond to the portion of the first code that is used as the (in the following, second) counter of the receiver. In this manner, the second counter is also not transmitted in the initial synchronization message on the communication medium, thereby providing a further protection against manipulation.

It is also advantageous that the transmitter change the first counter, in particular increment it by precisely one, following transmission of a message. This serves to maintain the integrity of the data.

Another advantage is derived when the receiver brings the second counter into conformance with the first counter on the basis of the received first partial counter. This makes it possible to at least partially compensate for failed messages, i.e., messages that are, in fact, sent by the transmitter, but not received by the receiver.

The transmitter advantageously checks the first partial code received by the receiver in that the transmitter, itself, calculates the third code and, in fact, in the same way that the receiver calculates the first code. The first partial code is then compared to a corresponding third partial code of the third code. This eliminates the need for a complex algorithm for decoding a code in order to see the underlying plaintext that may be used for verifying the receiver.

The transmitter advantageously may likewise check the second partial code received by the receiver in that the transmitter, itself, calculates a fourth code and, in fact, in the same way that the receiver calculates the second code. The second partial code is then compared to a corresponding fourth partial code of the fourth code. This eliminates the need for a complex algorithm for decoding a code in order to see the underlying plaintext that may be used for verifying the receiver.

The first key and the second key are preferably identical or, however, not identical. If they are not identical, both the transmitter and the receiver each require at least two keys (namely the first and the second). However, this provides increased protection against manipulation.

Upon application of the method, it is advantageous when the transmitter and receiver are control units in a Controller Area Network (CAN). Since the length of a message that is transmitted on a CAN is 64 bits, the advantage is derived using the method according to the present invention of only one required synchronization message compared to at least four messages under the related art until usable data are able to be transmitted as protected data.

A processing unit according to the present invention, for example, a control unit of a motor vehicle, is adapted, in particular in terms of software engineering, for implementing all steps of a method according to the present invention that are performed either by the transmitter or the receiver.

The implementation of the method in the form of software is advantageous since this entails especially low costs, in particular when an executing control unit is also used for other tasks and is, therefore, present anyway. Suitable data media for providing the computer program include, in particular, diskettes, hard drives, flash memories, EEPROMs, CD ROMs, DVDs, inter alia. A program may also be downloaded over computer networks (Internet, intranet, etc.).

Other advantages and embodiments of the present invention are derived from the description and the appended drawings.

It is understood that the aforementioned features and those which are still to be explained in the following may be used not only in the particular stated combination, but also in other combinations or alone, without departing from the scope of the present invention.

The method according to the present invention is schematically illustrated in the drawings with reference to an exemplary embodiment and is described in detail in the following with reference to the drawings.

BRIEF DESCRIPTION OF THE DRAWINGS

FIG. 3 shows schematically the time sequence of the protected transmission of messages upon entering of the transmitter and the receiver into a communication network in accordance with a preferred specific embodiment of the method according to the present invention.

DETAILED DESCRIPTION

Figure 1:
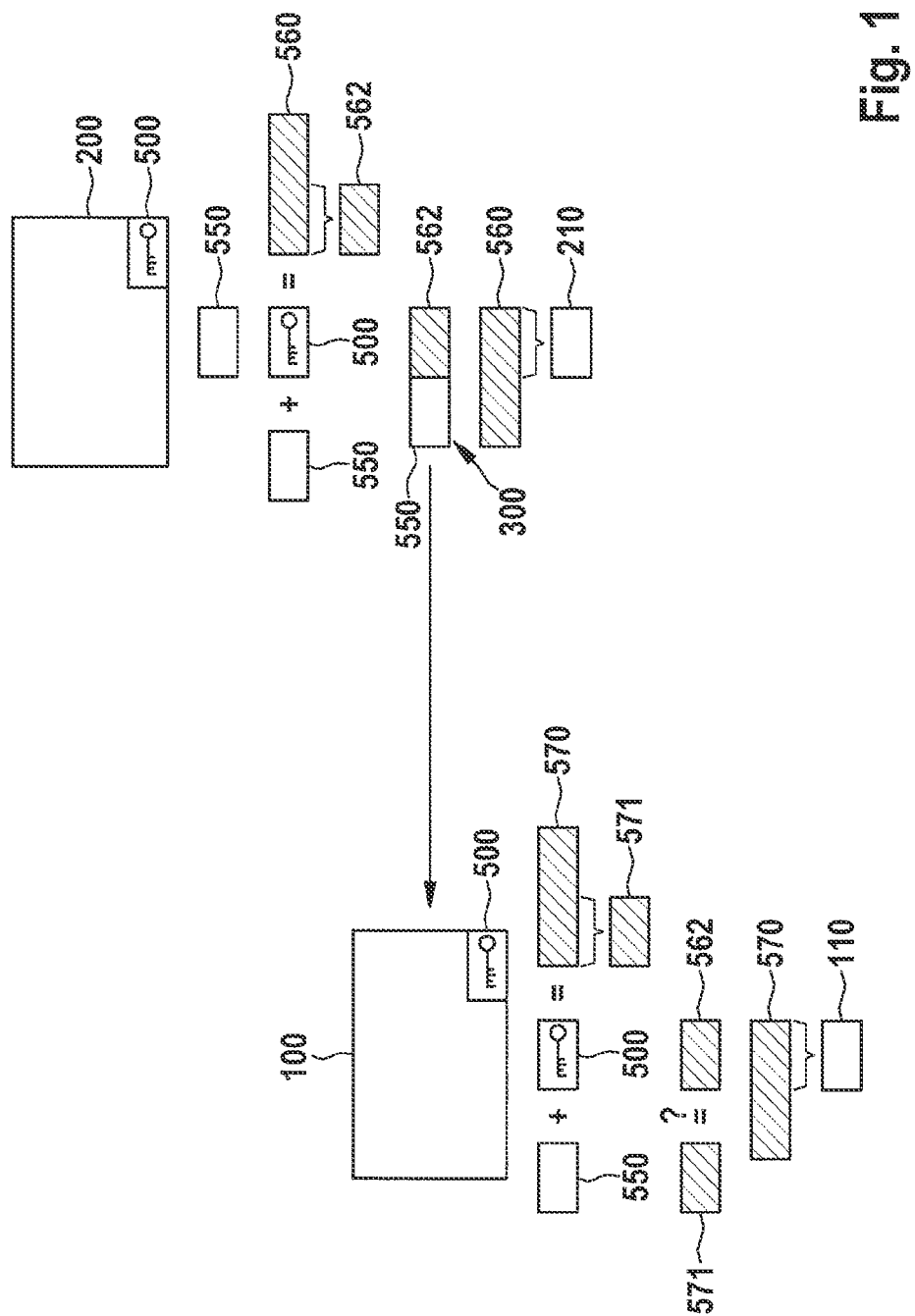
FIG. 1 shows schematically the sequence of a synchronization in the course of an authentication of a transmitter to a receiver in accordance with a preferred specific embodiment of a method according to the present invention.

FIG. 1 schematically shows the first part of a method according to the present invention, including a transmission of a synchronization message, in accordance with a preferred specific embodiment, the time sequence being indicated from top to bottom.

Transmitter 100 and receiver 200 each have the same symmetric key 500. With the aid of a random number generator, receiver 200 generates a random number 550 of a 32-bit length. Subsequently thereto, using symmetric key 500 that is similar to a checksum or a hash value, receiver 200 calculates a first code 560 of a 128-bit length in accordance with a predefined algorithm from random number 550 that is similar to a checksum or a hash value.

In an initial synchronization message 300, receiver 200 dispatches both random number 550, as well as a first partial code 562 of first code 560 via a communication medium, in a preferred specific embodiment a CAN bus, to transmitter 100. In this context, this first partial code 562 is composed of the first 32 bits of first code 560. Transmitter 100 receives synchronization message 300.

At this point, using symmetric key 500, transmitter 100 calculates a third code 570 from received random number 550, in accordance with the same algorithm as receiver 200. To perform a check of received first partial code 562, transmitter 100 compares a third partial code 571 of third code 570 to first partial code 562. In this context, third partial code 571 is composed of the first 32 bits of third code 570. When transmitter 100 and receiver 200 have the same symmetric key 500 and synchronization message 300 has been correctly transmitted and received, first and third partial codes 562 and 571 are identical, and thus first and third codes 560 and 570 are also identical.

Subsequently thereto, transmitter 100 uses the last 32 bits of third code 570 as first counter 110. Receiver 200 uses the last 32 bits of first code 560 as second counter 210. In the case that received partial code 562 is successfully checked by transmitter 100, first counter 110 and second counter 210 are identical.

Figure 2:
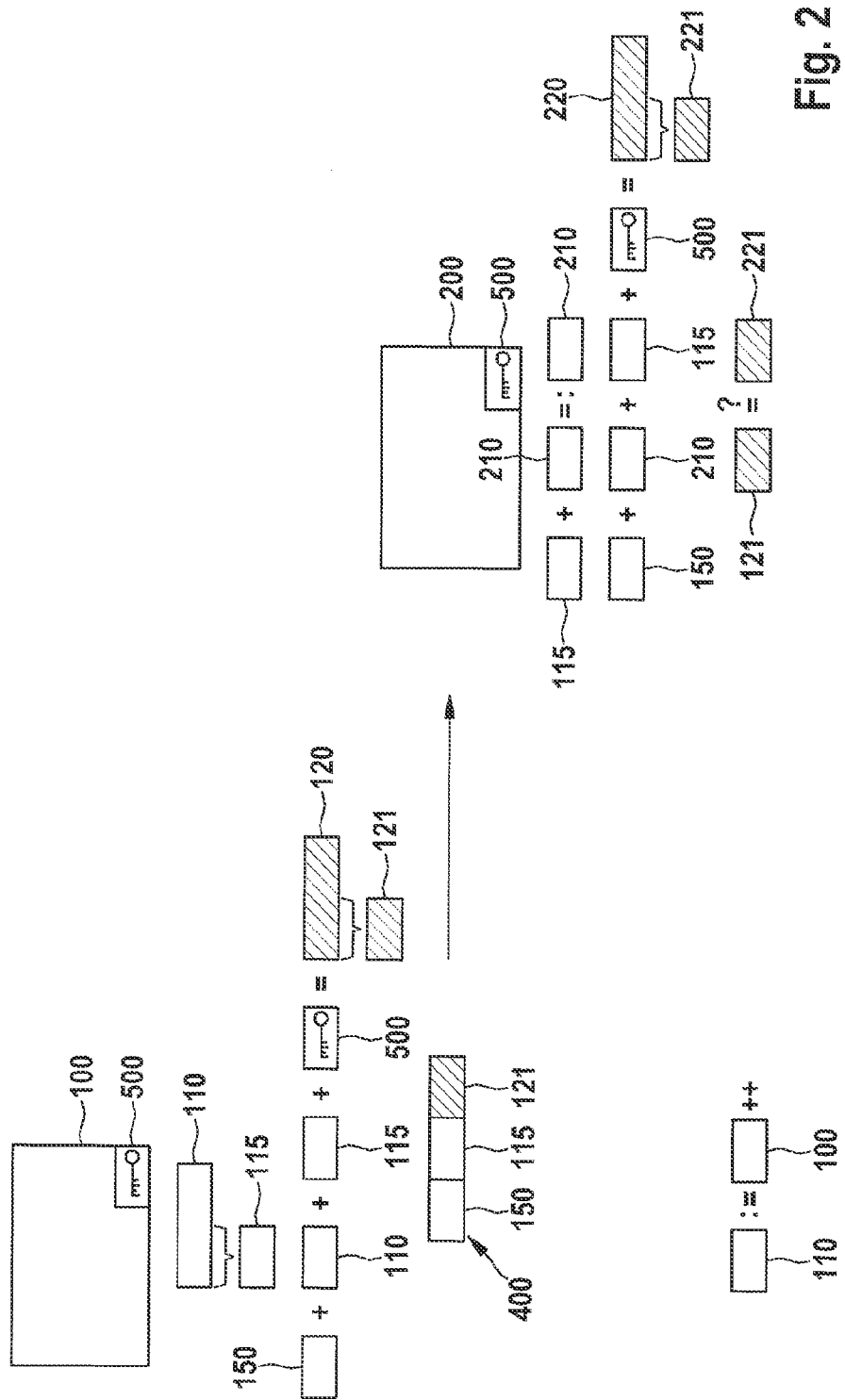
FIG. 2 shows schematically the sequence of the protected transmission of data from a transmitter to a receiver in accordance with a preferred specific embodiment of a method according to the present invention.

FIG. 2 schematically shows the second part of a method according to the present invention including a transmission of a message containing useful data, in a preferred specific embodiment; the time sequence being indicated from top to bottom.

From first counter 110, transmitter 100 determines a first partial counter 115 containing the first four bits of first counter 110. At this point, using symmetric key 500, transmitter 100 calculates a second code 120 of a 128-bit length, which is similar to a checksum or a hash value, from first counter 110, first partial counter 115, as well as useful data 150, in accordance with a predefined algorithm. Useful data 150 may be any desired data that transmitter 100 generates itself, for example, or, however, also has received in some other way. In any case, this is a question of data that are transmitted in messages, not for authentication, but for the operation of the transmitter and receiver, for example, of data needed in the course of an operation, for diagnostic purposes, or for programming a vehicle.

In a message 400, transmitter 100 transmits useful data 150, first partial counter 115, as well as a second partial code 121 of second code 120, composed of the first 32 bits of second code 120, to receiver 200. Receiver 200 receives message 400.

With the aid of first partial counter 115, receiver 200 brings second counter 210 in conformance with first counter 110. To that end, receiver 200 calculates the difference between the first four bits of second counter 210 and first partial counter 115. Receiver 200 increments second counter 210 by this difference and receives an adapted second counter 210.

At this point, to check second partial code 121, receiver 200 uses symmetric key 500 to calculate a fourth code 220 of a 128-bit length, from useful data 150, from first partial counter 115, as well as adapted second counter 210 thereof, in accordance with a predefined algorithm. In this context, the predefined algorithm is the same as that used by transmitter 100 to calculate second code 120.

Subsequently thereto, receiver 200 compares a fourth partial code 221 of fourth code 220, that is composed of the first 32 bits of fourth code 220, to received second partial code 121. Provided that the receiver uses same symmetric key 500 as transmitter 100, message 400 has been correctly received, and counter 220 has been correctly adjusted, second and fourth partial codes 121 and 221 are identical. Transmitter 100 has thus authenticated itself to receiver 200, and the integrity of transmitted message 400 is ensured.

Following transmission of message 400, transmitter 100 increments first counter 110 by one unit and thereby receives a new first counter 110. Transmitter 100 repeats the procedure illustrated in FIG. 2 and described above, including the corresponding, currently present useful data 150.

FIG. 3 schematically shows the time sequence upon entering of the transmitter and receiver into the communication network in a method according to the present invention in accordance with a preferred specific embodiment. The time sequence is indicated from top to bottom.

Transmitter 100 first arbitrarily preallocates values to first counter 110 thereof, preferably value zero, and sends messages 400 in accordance with the method clarified above and illustrated in FIG. 2. As soon as receiver 200 enters into the communication network, i.e., the control unit is started and is available at the CAN bus, for example, transmitter 200 sends an initial synchronization message 300 to transmitter 100. Thus, the method described above begins. From this point on, receiver 200 checks all messages 400 received by transmitter 100, in that the receiver compares second and fourth partial codes 121 and 221.

As soon as an authentication of transmitter 100 by receiver 200 has a negative outcome, i.e., second and fourth partial codes 121 and 221 are not identical. The method described above begins anew with the transmission of a synchronization message 300 from receiver 200 to transmitter 100.

What is claimed is:

1. A method of a communications network for authenticating a transmitter device of the network to a receiver device of the network for a protected transmission of messages by the transmitter device to the receiver device and over the communications network, the transmitter device and the receiver device, the method comprising:
   generating, by the receiver device, a first code by applying a first common key to a random number;
   transmitting, by the receiver device, to the transmitter device, and in a synchronization message, (a) the random number and (b) a first partial code, wherein the first partial code is composed of a first subsection of, and extracted from, the first code;
   generating, by the transmitter device and using the first common key and the random number received from the receiver device, a second code, wherein a first subsection of the second code forms a second partial code and a second subsection of the second code forms a first counter;
   determining, by the transmitter device, whether the second partial code matches the received first partial code;
   generating, by the transmitter device and using the first counter and the first common key or a second common key, a third code, wherein a first subsection of the third code forms a third partial code;
   conditional upon a result of the determination being that the first and second partial codes match, transmitting, by the transmitter device and to the receiver device, a data message that includes useful data, a first partial counter formed of a subsection of the first counter, and the third partial code;
   generating, by the receiver device and using the first partial counter and the first common key or the second common key used by the transmitter device to generate the third code, a fourth code, wherein a first subsection of the fourth code forms a fourth partial code; and
   comparing, by the receiver device, the fourth partial code to the third partial code to verify the transmitter device and the transmitted data message.

2. The method as recited in claim 1, wherein the third code is generated by the transmitter device further based on the useful data and the first partial counter.

3. The method as recited in claim 1, wherein a second subsection of the first code forms a second counter used by the receiver device for the verification.

4. The method as recited in claim 3, wherein the second subsection of the first code is not transmitted in the synchronization message from the transmitter device to the receiver device.

5. The method as recited in claim 3, wherein the generating of the fourth code includes adjusting the second counter to match the first counter using the transmitted first partial counter.

6. The method as recited in claim 3, wherein the generation of the fourth code is further based on the useful data and the second counter.

7. The method as recited in claim 3, wherein the second subsection of the first code and the second subsection of the second code are identical.

8. The method as recited in claim 1, further comprising changing, by the transmitter device, the first counter following the transmission of the data message.

9. The method as recited in claim 8, wherein the incrementing of the first counter is by one unit.

10. The method as recited in claim 8, wherein the transmitter device and the receiver device are control units and the communications network is a Controller Area Network (CAN).

11. A method of a communications network for authenticating a transmitter device of the network to a receiver device of the network for a protected transmission of messages by the transmitter device to the receiver device and over the communications network, the method comprising:
   transmitting, by the receiver device, to the transmitter unit, and in a synchronization message, a random number and a first partial code of a first code calculated from the random number using a first common key;
   checking, by the transmitter unit, the first partial code;
   generating, by the transmitter unit, a first counter;
   transmitting, by the transmitter unit and to the receiver device, a data message that includes useful data, a first partial counter of the first counter, and a second partial code of a second code calculated using the first common key or a second common key;
   generating, by the receiver device, a second counter from a portion of the first code;
   checking, by the receiver device, the second partial code to verify the transmitter unit and the transmitted message, wherein the checking of the second partial code includes:
   adjusting the second counter to the first counter using the transmitted first partial counter;
   calculating a third code using the first common key or the second common key used for the calculation of the second code; and
   comparing the second partial code transmitted by the transmitter device to a corresponding third partial code of the calculated third code.

12. The method as recited in claim 11, wherein the receiver device calculates the third code from the useful data, the first partial counter, and the second counter.

13. A method of a communications network for authenticating a transmitter device of the network to a receiver device of the network for a protected transmission of messages by the transmitter device to the receiver device and over the communications network, the method comprising:
   transmitting, by the receiver device, to the transmitter device, and in a synchronization message, a random number and a first partial code of a first code calculated from the random number using a first common key;
   checking, by the transmitter device, the first partial code, wherein the checking of the first partial code includes:
   calculating a second code from the transmitted random number, the calculation being performed using the first common key; and
   comparing the first partial code to a corresponding second partial code of the calculated second code;
   generating, by the transmitter device, a first counter;
   transmitting, by the transmitter device and to the receiver device, a data message that includes useful data, a first partial counter of the first counter, and a third partial code of a third code calculated using the first common key or a second common key;
   generating, by the receiver device, a second counter from a portion of the first code; and
   checking, by the receiver device, the third partial code to verify the transmitter device and the transmitted message.

14. The method as recited in claim 13, wherein the transmitter device uses a portion of the second code as a first counter.

15. The method as recited in claim 14, wherein the portion of the second code is identical to the portion of the first code.

16. A transmitter unit, which is adapted for implementing a method for self-authenticating the transmitter unit to a receiver unit for a protected transmission of messages to the receiver unit over a communications network, the transmitter unit comprising:
   processing circuitry; and
   a network interface;
   wherein:
   the transmitter unit is configured to receive, via the network interface and from the receiver unit, a synchronization message that includes a random number and a first partial code;
   the processing circuitry is configured to generate, using a first common key and the received random number, a first code;
   a first subsection of the first code forms a second partial code and a second subsection of the first code forms a first counter;
   the processing circuitry is configured to:
   determine whether the second partial code, extracted from the first code, matches the first partial code;
   generate, using the first counter and the first common key or a second common key, a second code, wherein a first subsection of the second code forms a third partial code; and
   conditional upon a result of the determination being that the first and second partial codes match, transmit to the receiver unit and via the network interface, a data message that includes useful data, a first partial counter formed of a subsection of, and extracted from, the first counter, and the third partial code.

17. A non-transitory computer-readable medium on which is stored a computer program that is executable by a processor of a transmitter device and that, when executed by the processor, causes the processor to perform a method for authenticating the transmitter device to a receiver device for a protected transmission of messages to the receiver device over a communications network, the method comprising:
   receiving from the receiver unit a synchronization message that includes a random number and a first partial code;
   generating, using a first common key and the received random number, a first code, wherein a first subsection of the first code forms a second partial code and a second subsection of the first code forms a first counter;
   determining whether the second partial code, extracted from the first code, matches the first partial code;
   generating, using the first counter and the first common key or a second common key, a second code, wherein a first subsection of the second code forms a third partial code; and
   conditional upon a result of the determination being that the first and second partial codes match, transmitting, to the receiver device and over the communications network, a data message that includes useful data, a first partial counter formed of a subsection of, and extracted from, the first counter, and the third partial code.

18. A method of a communications network for authenticating a transmitter device of the network to a receiver device of the network for a protected transmission of messages by the transmitter device to the receiver device and over the communications network, the transmitter device and the receiver device, the method comprising:
   receiving, by the transmitter device and from the receiver device, and synchronization message that includes a random number and a first partial code that is formed of a subsection of, and is an extraction from, a first code;

using, by the transmitter device, the received random number and a first common key to verify the received first partial code, wherein the first code is a code calculable from the random number using the first common key;

generating, by the transmitter device, a first counter;

generating, by the transmitter device and using the first common key or a second common key, a second code; and transmitting, by the transmitter device and to the receiver device, a data message that includes useful data, a first partial counter extracted from the first counter, and a second partial code formed of a subsection of, and extracted from, the second code, wherein the receiver device is configured to verify the second partial code using the first partial counter by:

(a) generating a third code using a second counter, the first partial counter, the useful data, and the first or second common key used by the transmitter device to generate the second code;

(b) extracting from the third code a third partial code; and (c) performing a comparison to verify that the second partial code is identical to the third partial code.

* * * * *